May 11, 1948.   A. E. McPHERSON   2,441,162
DEVICE FOR RECORDING ACCELERATION IN PLANES
Filed Aug. 6, 1945

Inventor
Albert E McPherson

By Ralph L Chappell

Attorney

Patented May 11, 1948

2,441,162

UNITED STATES PATENT OFFICE 2,441,162

DEVICE FOR RECORDING ACCELERATION IN PLANES

Albert E. McPherson, Bethesda, Md.

Application August 6, 1945, Serial No. 609,296

7 Claims. (Cl. 264—1)

(Granted under the act of March 3, 1883, as amended April 30, 1928; 370 O. G. 757)

This invention relates generally to accelerometers, and more particularly to accelerometers for recording impact accelerations over a large range of directions.

The presently available devices are limited to record accelerations in one particular direction only. My invention extends the idea of the previous inventions over a manifold of directions encompassed in as much as a 150 degree portion of a plane. It is particularly adapted for the recording of impact accelerations in crash landings. My device is of necessity more complex than the previous devices, but this complexity is justified in cases where a more complete record of acceleration is desired. If desired, a particularly complete record giving both directions and magnitudes of impact accelerations in any direction can be obtained by installing six devices of this type, three each in mutually perpendicular planes. My invention records accelerations exceeding certain threshold or preset values, thereby making possible a determination of direction of acceleration, and a distinction between accelerations of different directions.

The principal object of my invention is to provide an accelerometer that records accelerations in a manifold of directions encompassed within a given angular portion of a plane.

For a more complete understanding of the invention and for other objects and advantages thereof, reference should now be had to the following descriptions in connection with the accompanying drawings, in which Fig. 1 is a plan view of my inventions;

Figure 1:
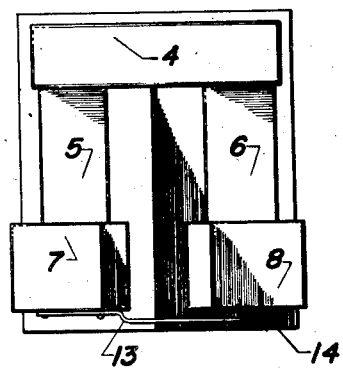
Figure 2:
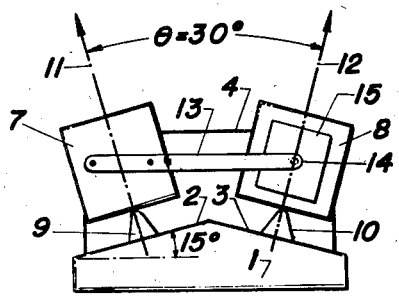
Fig. 2 is a front elevational view of the invention constructed to record accelerations over a 150 degree portion of a plane.
Figure 3:
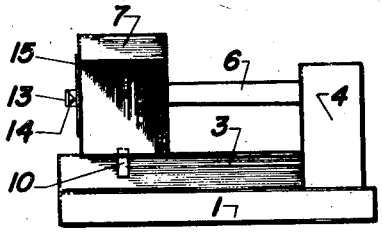
Fig. 3 is a side elevational view of the invention.

Referring now in detail to the drawings, Fig. 1 indicates a rectangular base having its top side consisting of two inclined surfaces 2 and 3 making an angle of 15 degrees with the horizontal. At one end of said base is a pedestal 4 integrally formed therewith. Secured to said pedestal are a pair of identical thin flexible leaf springs 5 and 6, cantilever supported by said pedestal, and arranged so that the planes of said leaf springs 5 and 6 are parallel to surfaces 2 and 3, respectively. Said leaf springs 5 and 6 are selected to have a large width in relation to their thickness so that they will be stiff against sidewise deflection and will oscillate in a direction normal to their respective planes only. To the free ends of said cantilever springs 5 and 6 are secured masses (M) 7 and 8. Said masses 7 and 8 are guided by the leaf springs so that motion thereof is limited to the direction of lines 11 and 12. Stop members 9 and 10 are provided on surfaces 2 and 3 and adapted to be in abutting engagement with masses 7 and 8, respectively. Spring arm 13, which is stiff in the direction of motion of the masses, is rigidly secured to mass 7. To the free end of said arm is attached a scribing element or "scratcher" 14 which is in sliding engagement with a target 15 which is chrome-plated or otherwise prepared for inscription thereon.

Said masses 7 and 8 are held in engagement with their associated stops by an initial threshold spring force F so that the masses 7 and 8 will not disengage from their associated stops until the components of acceleration along lines 11 and 12, respectively, exceeds a pre-set value of acceleration as given by the formula $$a_0 = \frac{F}{M}$$

The masses and springs are designed to make their deflections proportional to the acceleration actuating them.

Operation

In actual operation, my invention could be installed on a vehicle such as an airplane. For the recordation of impact acceleration for a crash landing over a range of 150 degrees frontal, the device should be mounted so that the plane through the longitudinal axes of the springs 5 and 6 is normal to the longitudinal axis of the airplane, and with the masses 7 and 8 forward of their respective associated stops 9 and 10. (If desired particularly complete record giving both directions and magnitudes of large accelerations in any direction could be obtained by installing six devices of this type, three each in two mutually perpendicular planes.) An impact or crash landing will result in some displacement of either or both of the masses. The relative displacement of said masses is recorded by the scribe 13 marking target 15. From the displacement of one mass relative to the other, the angle θ, and the calibration constants (deflection per unit acceleration) of the device, the magnitude and direction of the impact acceleration can be calculated.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. In an accelerometer, comprising: a support; a pair of thin leaf springs cantilever mounted on said support, adapted to deflect in individual planes, said springs having a large width in relation to thickness so that they will be stiff against deflection along the width axis; individual masses mounted on the free ends of said springs; an inscriptionable target mounted on one of said masses; a scribe mounted on the other mass slidably engaged with said target.

2. In an accelerometer, comprising: a support; a pair of thin leaf springs cantilever mounted on said support, adapted to deflect in individual planes, said springs having a large width in relation to thickness so that they will be stiff against deflection along the width axis; individual masses mounted on the free ends of said springs; an inscriptionable target mounted on one of said masses; a scribe mounted on the other mass slidably engaged with said target; and stops being held in engagement with said masses by an initial threshold spring force so that there will be no disassociation of said springs and said stops until the component of acceleration along a given range of direction exceeds said initial value.

3. In an accelerometer, comprising: a support; a pair of thin leaf springs cantilever mounted on said support, adapted to deflect in individual planes, said springs having a large width in relation to thickness so that they will be stiff against deflection along the width axis; masses mounted on said springs forming deflectable systems; recording means mounted on one of said deflectable systems and associated with the other of said systems to indicate relative displacement thereof.

4. In an accelerometer, comprising: a support; a pair of thin leaf springs cantilever mounted on said support, adapted to deflect in individual planes, said springs having a large width in relation to thickness so that they will be stiff against deflection along the width axis; masses mounted on said springs forming deflectable systems; recording means mounted on one of said deflectable systems and associated with the other of said systems to indicate relative displacement thereof; and stops associated with said systems, said deflectable systems being biased against said stops with an initial threshold spring force so that there will be no disassociation of said systems and said stops until the component of acceleration along a given range of direction exceeds said initial value.

5. In an accelerometer, comprising: a support; a pair of flexible acceleration responsive means cantilever mounted on said support, adapted to deflect in individual intersecting planes in directions substantially normal to said intersection; indicating means mounted on one of said flexible acceleration responsive means and associated with the other of said flexible acceleration responsive means to indicate relative displacement thereof.

6. In an accelerometer, comprising: a support; a pair of flexible acceleration responsive means cantilever mounted on said support, adapted to deflect in individual planes; indicating means mounted on one of said flexible acceleration responsive means and associated with the other of said flexible acceleration responsive means to indicate relative displacement thereof; and stops associated with said flexible acceleration responsive means, said flexible acceleration responsive means being biased against said stops with an initial threshold spring force so that there will be no disassociation of said flexible acceleration responsive means and said stops until the component of acceleration along a given range of directions exceeds said initial value.

7. In an accelerometer, comprising: a support; a plurality of masses elastically supported thereby on torsionally stiff cantilever beams adapted to deflect in individual intersecting planes in directions substantially normal to said intersection; and means associated with said masses for recording the magnitude and direction of the relative motion of said masses, one to the other.

ALBERT E. McPHERSON.

REFERENCES CITED

The following references are of record in the file of this patent:

FOREIGN PATENTS

| Number | Country | Date |
|---|---|---|
| 184,824 | Germany | May 21, 1917 |
| 551,557 | Germany | June 3, 1932 |
| 712,864 | France | Aug. 3, 1931 |